United States Patent
Chen et al.

(10) Patent No.: US 7,523,041 B2
(45) Date of Patent: Apr. 21, 2009

(54) METHOD OF DISPLAYING REAL-TIME SERVICE LEVEL PERFORMANCE, BREACH, AND GUARANTEED UNIFORMITY WITH AUTOMATIC ALERTS AND PROACTIVE REBATING FOR UTILITY COMPUTING ENVIRONMENT

(75) Inventors: Yen-Fu Chen, Austin, TX (US); John W. Dunsmoir, Round Rock, TX (US); Mark L. Feinberg, Smyrna, GA (US); Abhay Pradhan, Austin, TX (US); Hari Shankar, Cary, NC (US)

(73) Assignee: International Business Machines Corporation, Armonk, NY (US)

(*) Notice: Subject to any disclaimer, the term of this patent is extended or adjusted under 35 U.S.C. 154(b) by 540 days.

(21) Appl. No.: 10/666,796

(22) Filed: Sep. 18, 2003

(65) Prior Publication Data
US 2005/0066026 A1 Mar. 24, 2005

(51) Int. Cl.
*G06Q 99/00* (2006.01)
(52) U.S. Cl. ............... 705/1; 705/26; 705/27; 709/223; 709/224; 709/225; 709/226; 709/227; 709/228
(58) Field of Classification Search ............... 705/26, 705/27, 1; 709/223–228
See application file for complete search history.

(56) References Cited

U.S. PATENT DOCUMENTS

| | | | |
|---|---|---|---|
| 5,828,845 A | 10/1998 | Jagadish et al. | 395/200.59 |
| 6,496,831 B1 | 12/2002 | Baulier et al. | 707/101 |
| 6,502,133 B1 | 12/2002 | Baulier et al. | 709/224 |
| 6,515,968 B1 | 2/2003 | Combar et al. | 370/252 |

(Continued)

FOREIGN PATENT DOCUMENTS

JP 2002-024192 1/2002

(Continued)

OTHER PUBLICATIONS

"UUNet to break new ground with blanket service-level agreements." Ian Scales, CommunicationsWeek International, p. 1, Oct. 19, 1998. Retrieived via Dialog.*

(Continued)

*Primary Examiner*—Jeffrey A. Smith
*Assistant Examiner*—Michael A. Misiaszek
(74) *Attorney, Agent, or Firm*—Duke W. Yee; David A. Mims, Jr.; Gerald H. Glanzman (57) ABSTRACT

The present invention provides a method, apparatus, and computer program product for displaying real-time service level performance, breach, and guaranteed uniformity with automatic alerts and proactive rebating for a utility computing environment. Service level agreement parameters, based on a service level agreement between a customer and a service provider, are used to identify discrepancies in a promised service level for the utility computing environment. A real-time view of a current service level and the promised service level for the customer are displayed. When a discrepancy between the promised service level and the current service level occurs, a rebate is generated for the customer. Alerts identifying the discrepancy and its root cause are provided to the customer and the service provider for the discrepancy. Alerts may also be provided prior to the occurrence of the discrepancy so that an action may be performed to eliminate the potential discrepancy.

25 Claims, 8 Drawing Sheets

U.S. PATENT DOCUMENTS

| | | | |
|---|---|---|---|
| 6,671,818 B1 * | 12/2003 | Mikurak | 714/4 |
| 2003/0055677 A1 * | 3/2003 | Brown et al. | 705/1 |
| 2003/0065986 A1 * | 4/2003 | Fraenkel et al. | 714/47 |
| 2003/0079043 A1 | 4/2003 | Chang et al. | |
| 2004/0174823 A1 * | 9/2004 | Steele et al. | 370/252 |
| 2005/0286685 A1 * | 12/2005 | Vukovljak et al. | 379/28 |

FOREIGN PATENT DOCUMENTS

| | | |
|---|---|---|
| JP | 2002-101097 | 4/2002 |
| JP | 2003-124976 | 4/2003 |
| JP | 2003-124986 | 4/2003 |
| JP | 2003-150723 | 5/2003 |
| WO | 03014923 A2 | 2/2003 |
| WO | 03055153 A2 | 7/2003 |

OTHER PUBLICATIONS

Computer & Network LAN, pp. 73-80, Ohmsha JP, Dec. 1998, vol. 16.

* cited by examiner

| CUSTOMER | SERVICE LEVEL (SL) | BASE CHARGE | RANGE (HR) - BASED ON 24 HR SLA ||||||
|---|---|---|---|---|---|---|---|---|
| | | | 0-6 | 7-12 | 13-18 | 19-24 | 24-30 | 30+ |
| A | 1 | $100 | $68 | $45 | $22 | $3 | $4 | $25 |
| A | 2 | $60 | $49 | $32 | $16 | $2 | $3 | $20 |
| A | 3 | $80 | $57 | $38 | $18 | $3 | $3 | $20 |
| B | 1 | $120 | $90 | $65 | $38 | $5 | $5 | $40 |
| B | 2 | $100 | $69 | $50 | $29 | $4 | $4 | $29 |

METHOD OF DISPLAYING REAL-TIME SERVICE LEVEL PERFORMANCE, BREACH, AND GUARANTEED UNIFORMITY WITH AUTOMATIC ALERTS AND PROACTIVE REBATING FOR UTILITY COMPUTING ENVIRONMENT

BACKGROUND OF THE INVENTION

1. Technical Field

The present invention relates to an improved data processing system. In particular, the present invention relates to a method, apparatus, and computer instructions for displaying real-time service level information and providing rebating for a utility computing environment.

2. Description of Related Art

Customers are demanding to pay only for the levels of service that are rendered from a service provider. Utility computing is pay-per-usage processing power provided by a service organization using computers and facilities belonging to the service organization. Customers access the computers and facilities through a network or over the Internet and are charged according to the computing time used, such as CPU seconds, minutes or hours, and according to the resources used, such as storage, memory, and network. A utility computing host provisions IT resources that are requested by a customer. E-business refers to conducting business online. An e-business site may be very comprehensive and offer more than just selling its products and services. For example, it may feature monitoring, metering, reporting and billing services. Customers pay a service provider for a promised service level according to the terms of a service level agreement (SLA). The Oxford Dictionary of Computing, $4^{th}$ edition, suggests that "a typical SLA will set out the expected service levels in terms of availability, fault reporting, recovery from breakdowns, traffic levels, throughput, response times, training and advisory services, and similar measures of service quality as seen by the end user." An SLA may take the form of a legal contract, but an SLA need not necessarily be a "legally" enforceable contract. On multiple occasions, a promised service level is breached, under-performed, or exceeded causing the customer to pay for a service level that was not provided.

Customers are beginning to make a transition from a dedicated IT infrastructure to an on-demand utility computing service for e-business, but customers sometimes do not have a good comfort level and are reluctant to give up control. Currently, real-time service level tools that support utility computing middleware do not exist.

Therefore, it would be advantageous to provide a method and system for displaying real-time service level information and proactive rebating for discrepancies in service level performance.

SUMMARY OF THE INVENTION

The present invention provides a method, apparatus, and computer program product for displaying real-time service level performance, breach, and guaranteed uniformity with automatic alerts and proactive rebating for a utility computing environment. Service level agreement parameters, based on a service level agreement between a customer and a service provider, are used to identify discrepancies in a promised service level for the utility computing environment. A real-time view of a current service level and the promised service level for the customer are displayed. When a discrepancy between the promised service level and the current service level occurs, a rebate is generated for the customer. Alerts identifying the discrepancy and its root cause are provided to the customer and the service provider for the discrepancy. Alerts may also be provided prior to the occurrence of the discrepancy so that an action may be performed to eliminate the potential discrepancy, such as modifying the service level agreement and associated service level agreement parameters or correcting the root cause of the discrepancy.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
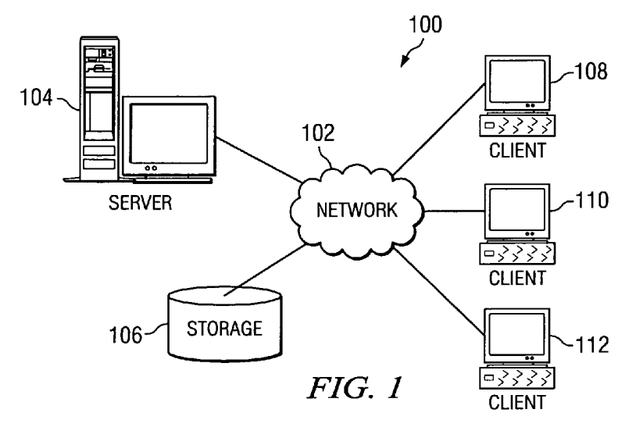
FIG. 1 is a pictorial representation of a network of data processing systems in which the present invention may be implemented.

With reference now to the figures, FIG. 1 depicts a pictorial representation of a network of data processing systems in which the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, server 104 is connected to network 102 along with storage unit 106. In addition, clients 108, 110, and 112 are connected to network 102. These clients 108, 110, and 112 may be, for example, personal computers or network computers. In the depicted example, server 104 provides data, such as boot files, operating system images, and applications to clients 108-112. Clients 108, 110, and 112 are clients to server 104. Network data processing system 100 may include additional servers, clients, and other devices not shown. In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention.

Figure 2:
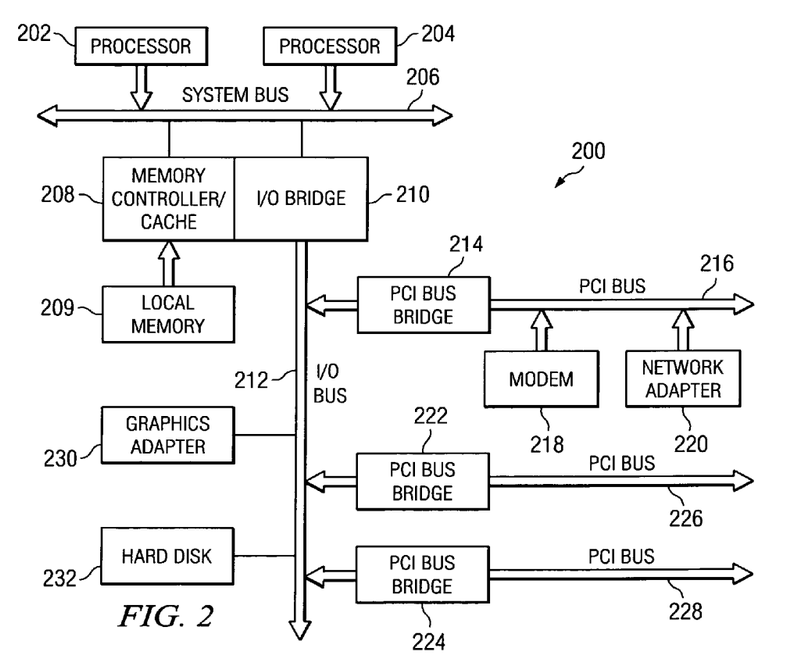
FIG. 2 depicts a block diagram of a data processing system that may be implemented as a server in accordance with a preferred embodiment of the present invention.

Referring to FIG. 2, a block diagram of a data processing system that may be implemented as a server, such as server 104 in FIG. 1, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support four PCI expansion slots or add-in connectors. Communications links to clients 108-112 in FIG. 1 may be provided through modem 218 and network adapter 220 connected to PCI local bus 216 through add-in boards.

Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM eServer pseries system, a product of International Business Machines Corporation in Armonk, N.Y., running the Advanced Interactive Executive (AIX) operating system or LINUX operating system.

Figure 3:
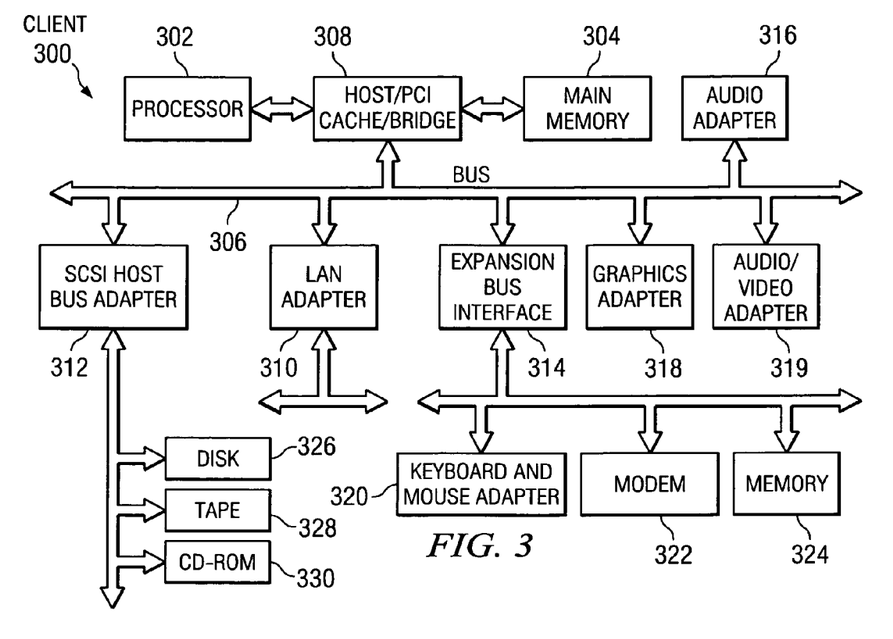
FIG. 3 illustrates a block diagram of a data processing system in which the present invention may be implemented.

With reference now to FIG. 3, a block diagram illustrating a data processing system is depicted in which the present invention may be implemented. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. Small computer system interface (SCSI) host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as Windows XP, which is available from Microsoft Corporation. An object oriented programming system such as Java may run in conjunction with the operating system and provide calls to the operating system from Java programs or applications executing on data processing system 300. "Java" is a trademark of Sun Microsystems, Inc. Instructions for the operating system, the object-oriented operating system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash read-only memory (ROM), equivalent nonvolatile memory, or optical disk drives and the like, may be used in addition to or in place of the hardware depicted in FIG. 3. Also, the processes of the present invention may be applied to a multiprocessor data processing system.

As another example, data processing system 300 may be a stand-alone system configured to be bootable without relying on some type of network communication interfaces. In a further example, data processing system 300 may be a personal digital assistant (PDA) device, which is configured with ROM and/or flash ROM in order to provide non-volatile memory for storing operating system files and/or user-generated data.

The depicted example in FIG. 3 and above-described examples are not meant to imply architectural limitations. For example, data processing system 300 also may be a notebook computer or hand held computer in addition to taking the form of a PDA. Data processing system 300 also may be a kiosk or a Web appliance.

Figure 4:
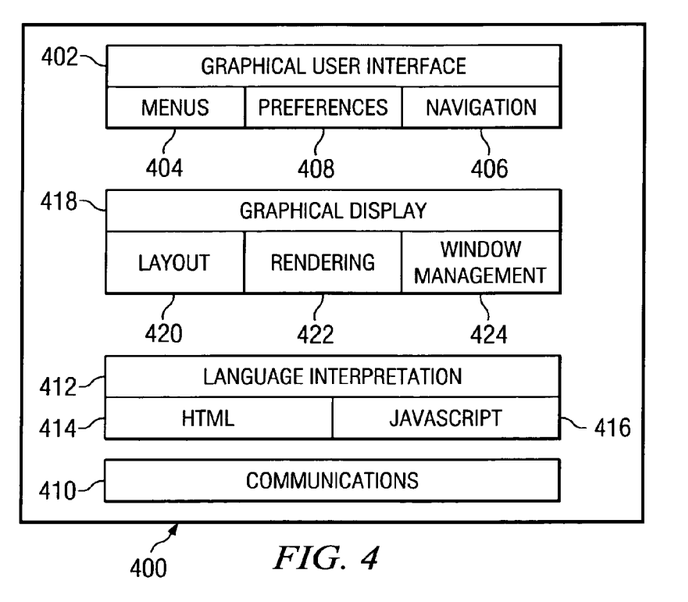
FIG. 4 is a block diagram of a browser program in accordance with a preferred embodiment of the present invention.

Turning next to FIG. 4, a block diagram of a browser program is depicted in accordance with a preferred embodiment of the present invention. A browser is an application used to navigate or view information in a distributed database, such as the Internet or the World Wide Web.

In this example, browser 400 includes a user interface 402, which is a graphical user interface (GUI) that allows the user to interface or communicate with browser 400. This interface provides for selection of various functions through menus 404 and allows for navigation through navigation 406. For example, menu 404 may allow a user to perform various functions, such as saving a file, opening a new window, displaying a history, and entering a URL. Navigation 406 allows for a user to navigate various pages and to select web sites for viewing. For example, navigation 406 may allow a user to see a previous page or a subsequent page relative to the present page. Preferences such as those illustrated in FIG. 4 may be set through preferences 408.

Communications 410 is the mechanism with which browser 400 receives documents and other resources from a network such as the Internet. Further, communications 410 is used to send or upload documents and resources onto a network. In the depicted example, communications 410 uses HTTP. Other protocols may be used depending on the implementation. Documents that are received by browser 400 are processed by language interpretation 412, which includes an HTML unit 414 and a JavaScript unit 416. Language interpretation 412 will process a document for presentation on graphical display 418. In particular, HTML statements are processed by HTML unit 414 for presentation while JavaScript statements are processed by JavaScript unit 416.

Graphical display 418 includes layout unit 420, rendering unit 422, and window management 424. These units are involved in presenting web pages to a user based on results from language interpretation 412.

Browser 400 is presented as an example of a browser program in which the present invention may be embodied. Browser 400 is not meant to imply architectural limitations to the present invention. Presently available browsers may include additional functions not shown or may omit functions shown in browser 400. A browser may be any application that is used to search for and display content on a distributed data processing system. Browser 400 make be implemented using know browser applications, such Netscape Navigator or Microsoft Internet Explorer. Netscape Navigator is available from Netscape Communications Corporation while Microsoft Internet Explorer is available from Microsoft Corporation.

Figure 5:
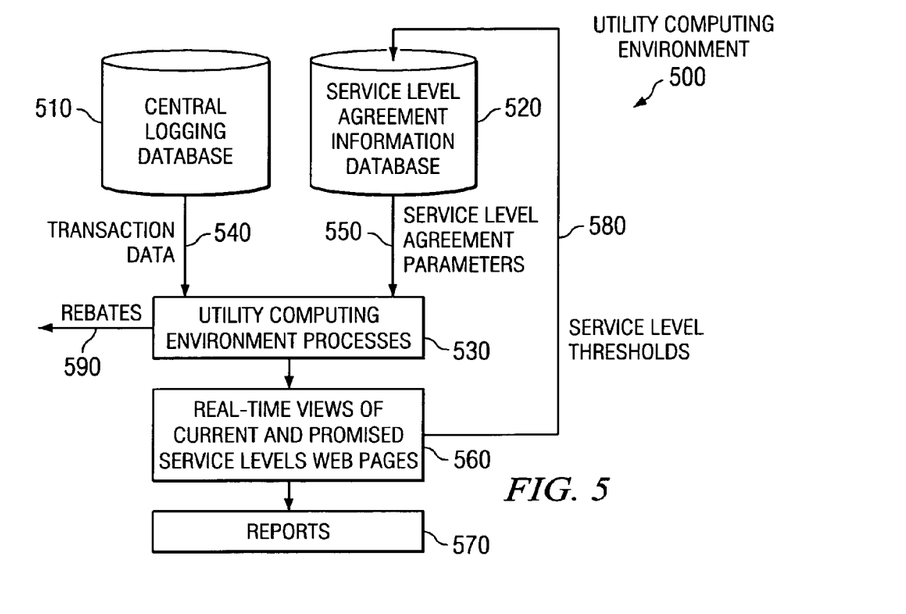
FIG. 5 is a block diagram of a utility computing environment in accordance with a preferred embodiment of the present invention.

FIG. 5 is a block diagram of a utility computing environment in accordance with the preferred embodiment of the present invention. Utility computing environment 500 provides a method and system for displaying real-time service level performance, breach, and guaranteed uniformity with automatic alerts and proactive rebating. Utility computing environment 500 provides rebates to customers for breaching a service level agreement and for guaranteed uniformity. Guaranteed uniformity is a process of crediting customers for unused time or resources when completing a service request. For example, if a customer requests and pays for additional storage from a utility computing host to be provided in a promised service level of 30 hours and the additional storage is provided in 26 hours, then the customer receives a credit back for 4 hours since the request was completed prior to the promised service level of 30 hours. Guaranteed uniformity assures that a customer only pays for the service received. A breach in a service level agreement may occur for a variety of causes, such as exceeding a promised time for a service request, hardware failures or outages, software failures, and performance failures. Although many breaches are time related, such as exceeding a promised time to complete a service request, other examples include server uptime requirements (such as 24 hours a day for 7 days per week), a server supporting 100,000 requests per day, and restoring a server to its original state during an unplanned outage.

Central logging database 510 contains captured transaction data. The transaction data is used to determine a current service level. Service level agreement information database 520 contains service level information from a contract or service level agreement and service level agreement parameters for customers. Utility computing environment processes 530 receives transaction data 540 and determines a current service level. Utility computing environment processes 530 receive service level agreement parameters 550, such as durations, transactions, configurations, and thresholds, from service level agreement information database 520. Service level agreement parameters 550 are used to identify discrepancies between a current service level and a promised service level for a customer. Discrepancies are identified when a current service level does not satisfy a promised service level. A discrepancy may occur due to a breach in a service level agreement, for example when exceeding a promised amount of time to complete a service, or due to guaranteed uniformity, for example when completing a service prior to a promised amount of time to complete the service. In other words, whenever a promised service level is not met, a discrepancy occurs. A root cause is determined for a discrepancy that breaches a promised service level.

Utility computing environment processes 530 generate web pages 560, which display real-time views of current and promised service levels. The web pages display information, such as real-time service level information with respect to a promised service level, alerts that a discrepancy is about to occur or has occurred, and rebate reports for example. Reports 570 may be produced using web pages 560. Reports may be sent to various programs and devices, such as email addresses, pagers, and network devices, and may automatically post to a customer or service provider web page for viewing. Reports 570 may be detailed reports or notifications with minimal text. Service level thresholds 580 may be used to alert a customer, service provider, or utility computing host that a discrepancy has occurred or may occur at a future time. For example, a service level threshold of 25% may be used to notify a utility computing host that 25% of a promised completion time remains to complete a service request without breaching a service level agreement. Web pages 560 also allow a user to modify or add additional service level thresholds, such as service level thresholds 580, and store the service level thresholds in service level agreement information database 520. Web pages 560 are described in more detail in the following figures.

Utility computing environment processes 530 identify discrepancies between a current service level and a promised service level. Customers who do not receive their agreed level of service may be entitled to a rebate. For example, a customer with a service level agreement entitling the customer to a 24-hour response time for a service request may request for more storage. If it takes longer than 24 hours for the request to be fulfilled, then the customer would receive a rebate, such as rebates 590. Additionally, if the service of providing the extra storage is completed in less than 24 hours (presumably because the request was simple enough not to require a full 24 hours to fulfill), the customer may also receive a rebate, such as rebate 590; this is referred to as guaranteed uniformity. A human adjudication panel may approve rebates prior to dispersing the rebates to the customers.

This type of rebating may encourage customers to adjust their promised service levels to match the IT support necessary for their business. When a discrepancy in the current service level is identified, a customer may choose to adjust the service level rather than receive a rebate, such as rebates 590. For example, a customer may choose to pay for a 20-hour service level rather than a 24-hour service level.

Figure 6A:
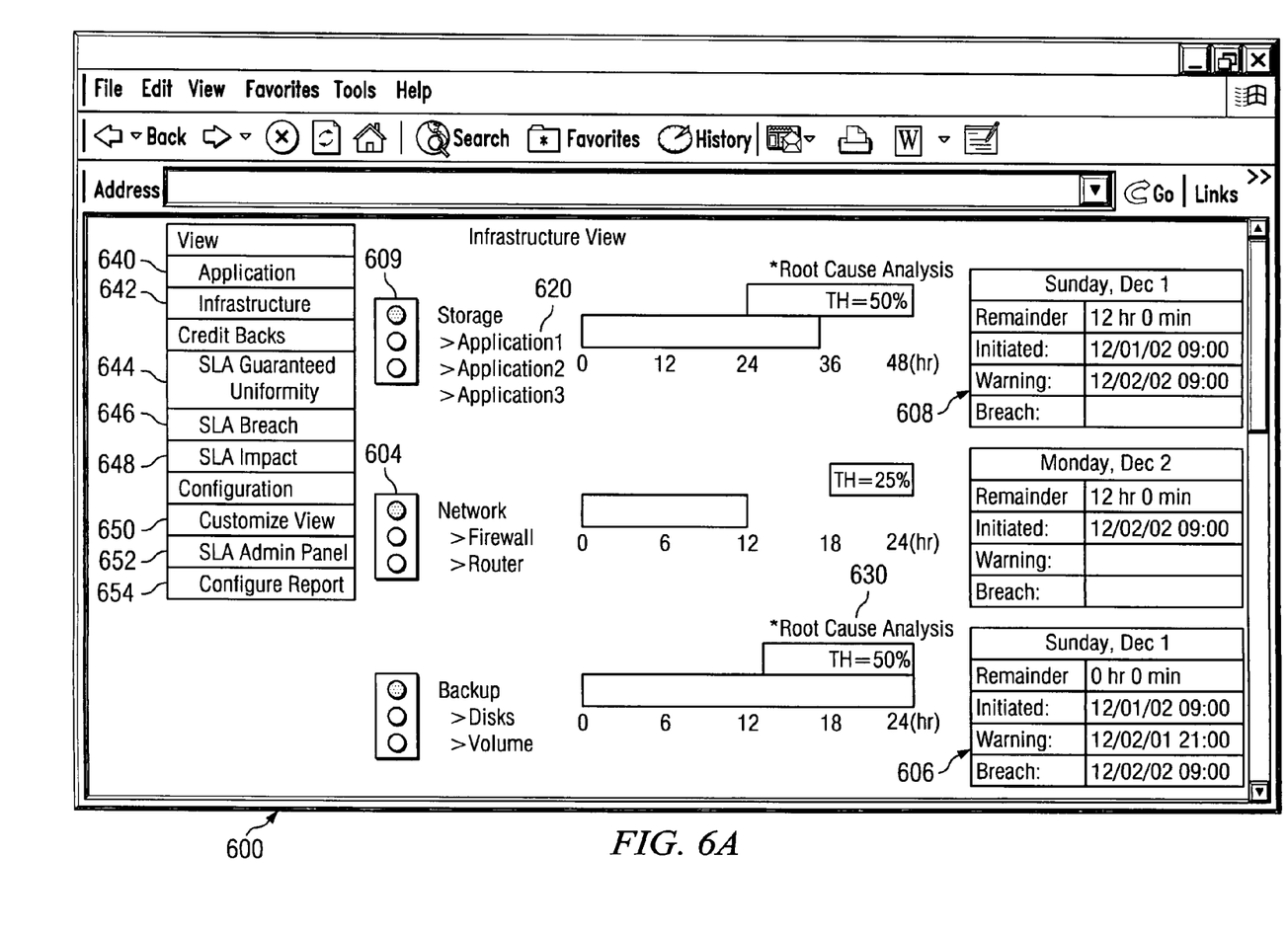
FIGS. 6A and 6B are screen layouts for displaying real-time service level performance information in accordance with a preferred embodiment of the present invention.
Figure 6B:
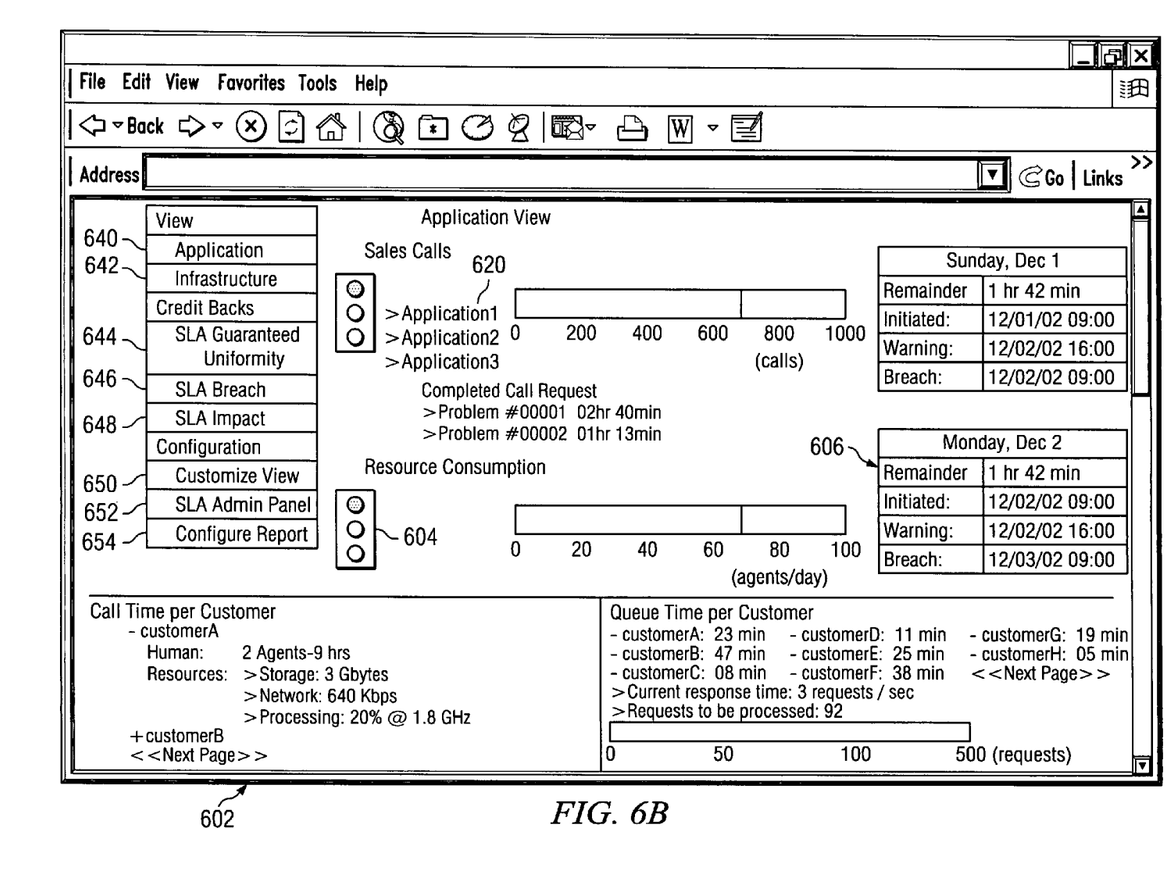

FIGS. 6A and 6B are screen layouts for displaying real-time service level performance information in accordance with a preferred embodiment of the present invention. Screen 600 displays current real-time service level information for an infrastructure view with respect to a promised service level for components such as storage, network, and backup usage for a customer. Screen 602 displays current real-time service level information for an application view with respect to a promised service level for software applications residing on a utility computing environment, such as a database, a helpdesk application, a shopping cart application, and a banking application. The level of detail for the infrastructure and application views may vary from a high level SLA breach severity level indicator, such as red, yellow, and green light on a traffic light 604, to a detailed chart indicating dates and times for requests and associated service level discrepancies, such as chart 606. Chart 606 displays the date of a service request, the time that remains before a breach occurs, the date and time that the service request was initiated, and the date and time for an occurrence of a warning and a breach. Screens 600 and 602 are examples of screen layouts that may be used to monitor the current service level performance for the infrastructure view and application provisioned by a utility computing environment. The top view for a user may be set to either an infrastructure view or an application view.

An infrastructure view, depicted in FIG. 6A, allows a user to view Information Technology hardware and software components. A customer may view the progress of a service request for provisioning additional storage. The example on screen 600 shows a request for addition storage was initiated on Dec. 1, 2002 at 9:00. Since a service level threshold of 50% for a 48-hour service level agreement is set, a warning occurred at Dec. 2, 2002 at 9:00. Chart 608 indicates that there is 12 hours remaining prior to a breach. Traffic light 609 may display a yellow light indicating that a warning has occurred. The preferred embodiment of the present invention allows a user to customize the infrastructure view as needed.

An application view, depicted in FIG. 6B, allows a user to view service level information for a software application, such as a help desk. The example on screen 602 shows that the utility computing environment may support 1000 calls per day. The application view may also display the resource consumption for the software applications on the utility computing environment, such as the number of agents and time used per service call and/or customer, the storage, network, and processing resources used by customer, the current response time, the requests to be processed, and the time spent for each service call. The resource consumption information displayed may include both computer resources and human resources. Various data may be displayed to allow a customer, a service provider, and a utility computing host to view a current service level for a customer. The preferred embodiment of the present invention allows a user to customize the application view as needed.

A user may select a specific component on screens 600 and 602 to retrieve more details on the component. Details of a component, such as Application1 620, may be viewed by clicking on the application name. The user may also click on a portion of the screen, such as root cause analysis 630, to retrieve more details for a discrepancy between a current service level and a promised service level. Screens 600 and 602 include a menu, which allows the user to navigate through the various web pages. Menu option "Application" 640 displays an application view of real-time service level performance information and menu option "Infrastructure" 642 displays an infrastructure view of real-time service level performance information. Menu option "SLA Guaranteed Uniformity" 644 generates a web page described in more detail in FIG. 7B. Menu option "SLA Breach" 646 generates a web page described in more detail in FIG. 7A. Menu option "SLA Impact" 648 generates a web page that describes the impact of breaches in service level agreements. A user may customize the infrastructure view and the application view using menu option "Customize View" 650. Additional tailoring may be completed, such as setting service level thresholds, using menu option "SLA Admin Panel" 652, which is described in more detail in FIG. 9. Menu option "Configure Report" 654 allows a user to configure reports for the utility computing environment.

Screen 600 may display alerts, such as warnings prior to the occurrence of a discrepancy or breach alerts when a discrepancy occurs. Alerts may be generated using service level thresholds provided by a customer, a service provider or a utility computing host. Multiple levels of alerting and service level thresholds may be configured. In the example provide on screen 600, an alert or warning is initiated for "storage" since a threshold percentage of 50% has been set for "storage" and "storage" has exceeded the 50% threshold. An alert may be displayed visually on screen 600 and by generating a report. Some examples for displaying an alert on screen 600 include using bar graphs, highlighting a yellow signal on a traffic light, or flashing warning dates and times.

Figure 7A:
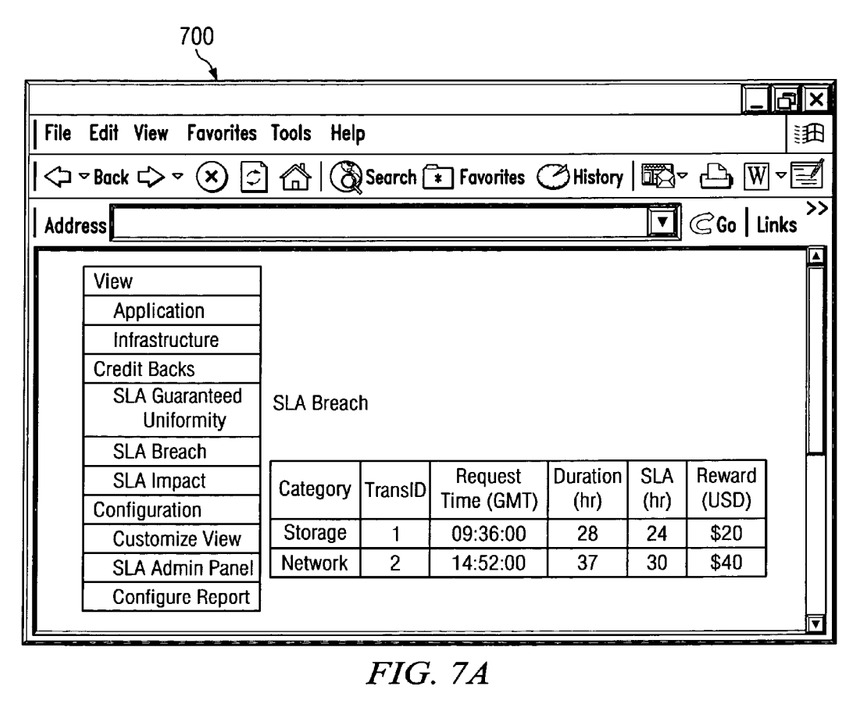
FIG. 7A is a screen layout for displaying proactive rebating information for breaching a service level agreement in accordance with a preferred embodiment of the present invention.

FIG. 7A is a screen layout for displaying proactive rebating information for breaching a service level agreement in accordance with a preferred embodiment of the present invention. Screen 700 displays identified discrepancies between a promised service level and the service level provided for provisioning "storage" and "network" resources. The discrepancies are used to determine the rebate or "breach reward" for the customer. Breach rewards are in the amounts of $20 and $40 in the example displayed on screen 700. In the example on screen 700, storage allocation was completed 28 hours, which is 4 hours more than promised, and therefore, automatically generates a breach reward report for an administrator. An adjudication panel may use such a report in reviewing the breach rewards prior to dispersing the rebate to the customer.

Figure 7B:
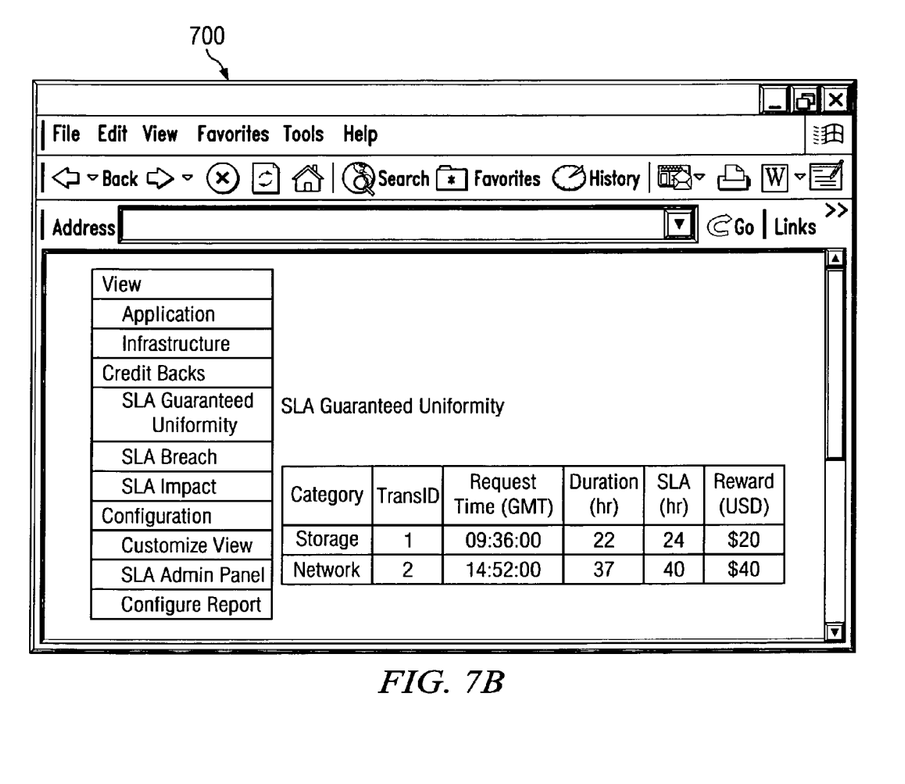
FIG. 7B is a screen layout for displaying proactive rebating information for guaranteed uniformity in accordance with a preferred embodiment of the present invention.

FIG. 7B is a screen layout for displaying proactive rebating information for guaranteed uniformity in accordance with a preferred embodiment of the present invention. Screen 710 displays identified discrepancies between a promised service level and the service level provided for provisioning "storage" and "network" resources. The discrepancies are used to determine the rebate or "credit back" for the customer. Rebates are in the amounts of $20 and $40 in the example displayed on screen 710. In the example on screen 710, storage allocation was completed 22 hours, which is 2 hours less than promised, and therefore, automatically generates a rebate report for an administrator. An adjudication panel may use such a report in reviewing the discrepancy prior to dispersing the rebate to the customer.

Figure 8:
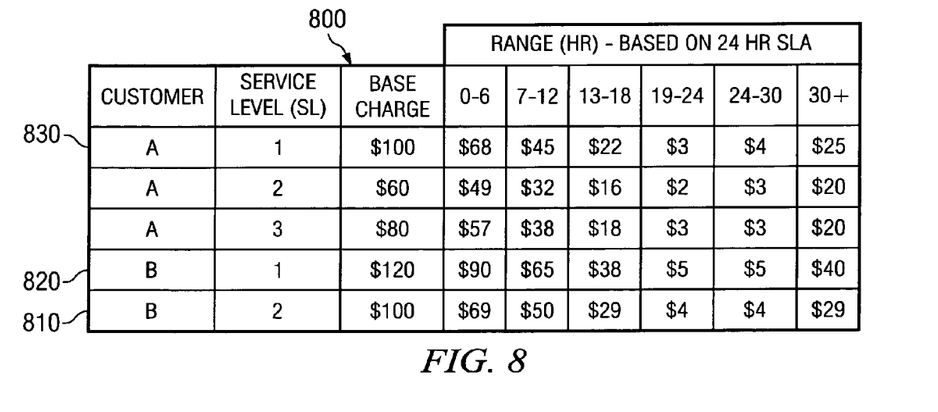
FIG. 8 is an example of a table that may be utilized for determining rebates for discrepancies in accordance with a preferred embodiment of the present invention.

FIG. 8 is an example of a table that may be utilized for determining rebates for discrepancies in accordance with a preferred embodiment of the present invention. Table 800 is an example of a table that may be used in determining a rebate for a customer with a 24-hour service level. A table or multiple tables may be used to store rebate amounts for various ranges of hours below and above a promised service level. In the example data of table 800, both customer A and customer B have multiple service level agreements. As shown in row 810, customer B pays a base charge of $100 for service level 2. If a service level is breached or a service request is complete prior to a promised service level completion time, a customer may receive an automatic rebate or credit back. For example, if a customer requests 200 gigabytes of additional storage and the storage allocation is completed in 20 hours, the customer receives a rebate of 4 hours since the promised service levels is for the request to be completed in 24 hours. If the customer is customer B with service level 1, shown in row 820, then the rebate for the 4-hour difference is $5. In another example, customer A with service level 1, shown in row 830, requests the addition of a server. If the request is completed in 18 hours, customer A receives a rebate of $22.

In the preferred embodiment of the present invention, a customer may have multiple service level agreements. For example, a customer is able to sign up for different service levels with different prices based on trending, analysis, and prediction of requested completion times. For example, if a customer pays for a service level agreement of 24 hours each month and service requests are being completed in 20 hours, a customer may chose to pay for a 20 hour service level agreement during busy times and switch to a less expensive service level agreement, such as a 50 hour service level agreement, during less busy times. The present invention allows a customer to subscribe or update their service level agreement and price based on trending and analysis.

In another embodiment of the present invention, the rebate may be calculated as a percentage of a base charge. Table 800 may be stored in a database, such as for example service level agreement information database 520 in FIG. 5.

Figure 9:
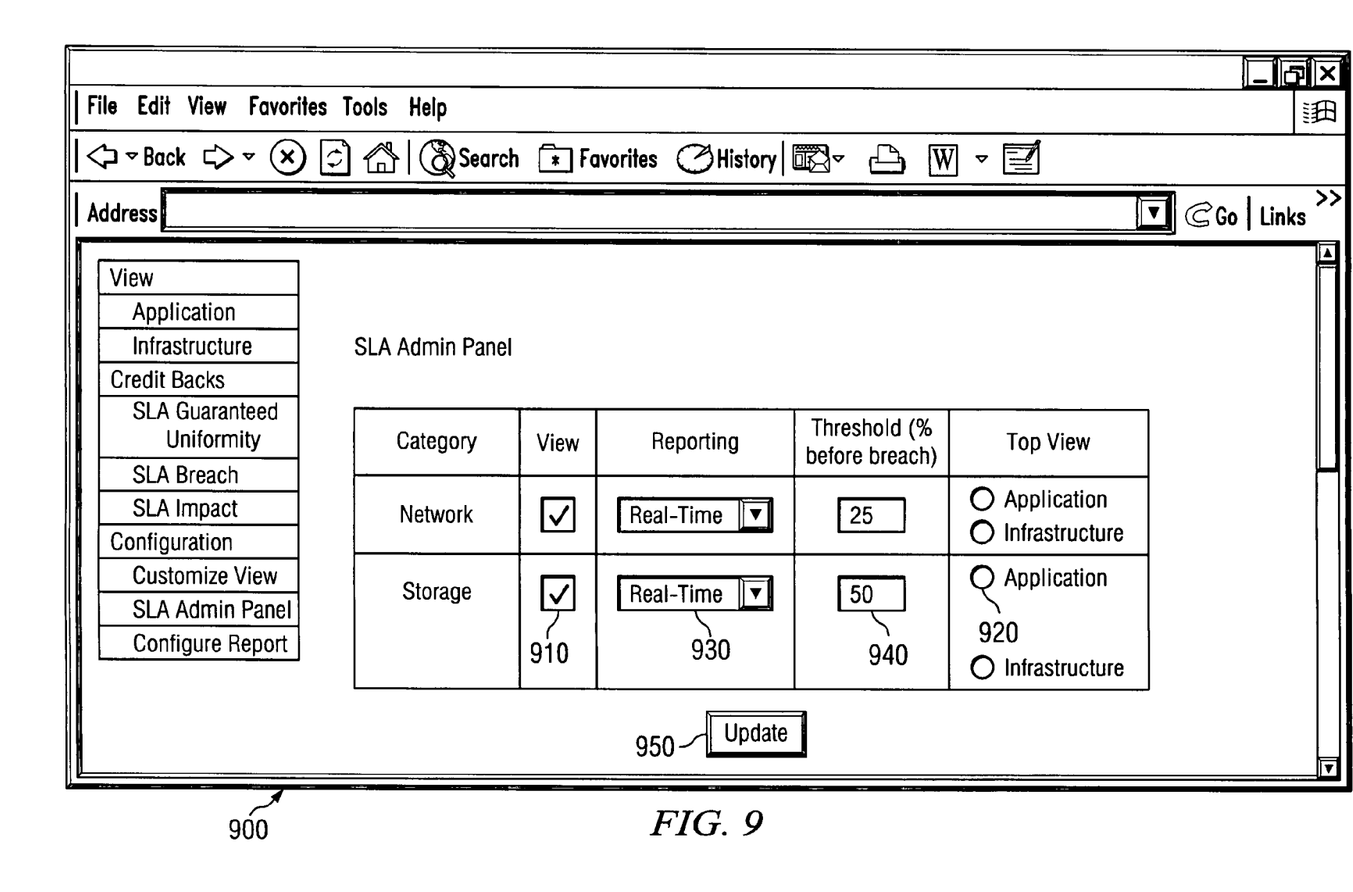
FIG. 9 is a screen layout for displaying a customer customization and configuration interface in accordance with a preferred embodiment of the present invention.

FIG. 9 is a screen layout for displaying a customer customization and configuration interface in accordance with a preferred embodiment of the present invention. Screen 900 allows a user to determine whether or not to view a particular category, set thresholds, and determine the type of reporting, and determine whether the top view is an application view or an infrastructure view. A category is a grouping of services for a utility computing environment, such as "network", "storage", and "backup". A customer may select which categories to view by click on the view selection box, such as view box 910. A customer may select application or infrastructure to indicate the view for the top view of the service level information. For example, if a customer selects the application button 920 for the "storage" category, then service level information for software applications, such as a help desk application, a banking application, a database, and a shopping cart, may be displayed. Reporting can also be tailored by selecting an option, such as real-time or historical, from drop-down box 930 to customize the report data. Additionally, a user may enter a service level threshold, such as a percentage of time before a breach occurs, in box 940. A service level threshold may be used to generate alerts prior to the occurrence of a discrepancy between a current service level and a promised service level. Update button 950 may be selected to generate the indicated changes.

Additionally, a service provider may use screen 900 or a similar screen to customize infrastructure and application views and configure reports.

Thus, the present invention provides an improved method, apparatus, and computer instructions for displaying real-time service level information and proactive rebating for discrepancies in service level performance. Proactive rebating provides a method for assuring that customers only pay for service received. By offering proactive rebating for discrepancies in a current service level, customers may transition to a utility computing environment more comfortably and with less concern. The present invention also provides the ability to analyze changing business needs for IT support by viewing real-time and historical service level performance information.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a data processing system for a utility computing environment, the method comprising:

setting service level thresholds for the utility computing environment, wherein the service level thresholds are based on a service level agreement with a customer;

displaying a view of a current service level for the customer;

presenting a view of a promised service level based on service level agreement parameters;

identifying a plurality of discrepancies between the promised service level and the current service level, wherein one of the plurality of discrepancies occurs in response to successfully completing a service request using less time than specified in the service level agreement, and wherein another of the plurality of discrepancies occurs in response to breeching to the service level agreement;

generating a first rebate in response to successfully completing the service request using less time than specified in the service level agreement based on a completion time and a promised completion time, wherein the completion time is an amount of time used to successfully complete the service request, wherein the promised completion time is an agreed upon amount of time to complete the service request specified in the service level agreement, and wherein the completion time is less than the promised completion time;

generating a second rebate in response to breeching the service level agreement; and providing the first rebate and the second rebate to the customer for the plurality of discrepancies, wherein the first rebate and the second rebate assure that the customer pays for service rendered.

2. The method of claim 1, wherein the service level agreement parameters include at least one of a duration, a transaction, a configuration, and a threshold.

3. The method of claim 1 further comprising:

modifying the service level thresholds using a graphical user interface.

4. The method of claim 1, wherein the service level thresholds are used to generate a warning prior to the occurrence of the plurality of discrepancies.

5. The method of claim 1, wherein breeching the service level agreement includes exceeding the service level agreement parameters, hardware failures, hardware outages, software failures, performance failures, and failure to meet agreed upon requirements of the service level agreement.

6. The method of claim 1, wherein the service level thresholds are set for at least one of a customer, a service provider, and a utility computing host.

7. The method of claim 6 further comprising:
alerting the at least one of the customer, the service provider, and the utility computing host of the plurality of discrepancies and a root cause for the plurality of discrepancies.

8. The method of claim 1 further comprising:
providing an option to customize the view of the current service level and the view of the promised service level.

9. The method of claim 1, wherein the view of a current service level is at least one of a real-time view and a historical view.

10. The method of claim 1 further comprising:
displaying a relationship between the current service level and the promised service level based on the service level agreement parameters, wherein the relationship indicates a severity level for the plurality of discrepancies.

11. The method of claim 10, wherein a severity level indicator comprises a red light, a yellow light, and a green light on a traffic light.

12. The method of claim 1, wherein the first rebate is additionally based on crediting the customer when successfully completing a service request using both less time and less resources than specified in the service level agreement.

13. A method in a data processing system for a utility computing environment, the method comprising:
displaying at least one of an infrastructure view and an application view of a current service level for a customer, wherein the infrastructure view contains information technology hardware and software components, wherein the application view contains software applications residing on utility computing resources, and wherein the infrastructure view and the application view are linked;
presenting a view of a promised service level based on service level agreement parameters, wherein the infrastructure view and the application view show a relationship between the current service level and the promised service level, and wherein the relationship indicates a progress level of a service request with respect to a service level agreement with the customer;
generating a first rebate in response to successfully completing a service request using less time than specified in the service level agreement based on a completion time and a promised completion time, wherein the completion time is an amount of time used to successfully complete the service request, wherein the promised completion time is an agreed upon amount of time to complete the service request specified in the service level agreement, and wherein the completion time is less than the promised completion time;
generating a second rebate in response to breeching the service level agreement;
providing the first rebate and the second rebate to a customer when a plurality of discrepancies between the current service level and the promised service level occur, wherein the first rebate and the second rebate assure that the customer pays for service rendered, wherein one of the plurality of discrepancies occurs in response to successfully completing the service request using less time than specified in the service level agreement, and wherein another of the plurality of discrepancies occurs in response to breeching to the service level agreement;
retrieving additional details of the at least one of the infrastructure view and the application view by clicking on a component of the at least one of the infrastructure view and the application view, wherein the additional details include the rebate and an impact for breaching the service level agreement; and
switching between the infrastructure view and the application view.

14. The method of claim 13, wherein a view of the current service level includes at least one of a warning, an alert, a breach, a duration, a transaction, a configuration, a threshold, a rebate, a utility computing resource, a consumed computer resource, and a consumed human resource.

15. The method of claim 13 farther comprising:
alerting at least one of a customer, a service provider, and a utility computing host of the plurality of discrepancies between the current service level and the promised service level, wherein the relationship shows a severity level for the plurality of discrepancies.

16. The method of claim 13, wherein breaching the service level agreement includes exceeding service level agreement parameters hardware failures, hardware outages, software failures, performance failures, and failure to meet agreed upon requirements of the service level agreement.

17. The method of claim 13, wherein the first rebate is additionally based on crediting the customer when successfully completing a service request using both less time and less resources than specified in the service level agreement.

18. A data processing system for a utility computing environment, the data processing system comprising:
setting means for setting service level thresholds for the utility computing environment, wherein the service level thresholds are based on a service level agreement with a customer;
displaying means for displaying a view of a current service level for the customer;
presenting means for presenting a view of a promised service level based on service level agreement parameters;
identifying means for identifying a plurality of discrepancies between the promised service level and the current service level, wherein one of the plurality of discrepancies occurs in response to successfully completing a service request using less time than specified in the service level agreement, and wherein another of the plurality of discrepancies occurs in response to breeching to the service level agreement;
first generating means for generating a first rebate in response to successfully completing the service request using less time than specified in the service level agreement based on a completion time and a promised completion time, wherein the completion time is an amount of time used to successfully complete the service request, wherein the promised completion time is an agreed upon amount of time to complete the service request specified in the service level agreement, and wherein the completion time is less than the promised completion time;
second generating means for generating a second rebate in response to breeching the service level agreement; and
providing means for providing the first rebate and the second rebate to the customer for the plurality of discrepancies, wherein the first rebate and the second rebate assure that the customer pays for service rendered.

19. The data processing system of claim 18 further comprising:

alerting means for alerting at least one of a customer, a service provider, and a utility computing host of the plurality of discrepancies and a root cause for the plurality of discrepancies.

20. The data processing system of claim 18 further comprising:
providing means for providing an option to customize the view of the current service level and the view of the promised service level.

21. A computer program product in a computer recordable-type medium having encoded thereon instructions executed on a computer for a utility computing environment, the computer program product comprising:
first instructions for setting service level thresholds for the utility computing environment, wherein the service level thresholds are based on a service level agreement with a customer;
second instructions for displaying a view of a current service level for the customer;
third instructions for presenting a view of a promised service level based on service level agreement parameters;
fourth instructions for identifying a plurality of discrepancies between the promised service level and the current service level, wherein one of the plurality of discrepancies occurs in response to successfully completing a service request using less time than specified in the service level agreement, and wherein another of the plurality of discrepancies occurs in response to breeching to the service level agreement;
fifth instructions for generating a first rebate in response to successfully completing the service request using less time than specified in the service level agreement based on a completion time and a promised completion time, wherein the completion time is an amount of time used to successfully complete the service request, wherein the promised completion time is an agreed upon amount of time to complete the service request specified in the service level agreement, and wherein the completion time is less than the promised completion time;
sixth instructions for generating a second rebate in response to breeching the service level agreement; and
seventh instructions for providing the first rebate and the second rebate to the customer for the plurality of discrepancies, wherein the first rebate and the second rebate assure that the customer pays for service rendered.

22. The computer program product of claim 21 further comprising:
instructions for alerting at least one of a customer, a service provider, and a utility computing host of the plurality of discrepancies and a root cause for the plurality of discrepancies.

23. The computer program product of claim 21 further comprising:
instructions for providing an option to customize the view of the current service level and the view of the promised service level.

24. A computer program product in a computer recordable-type medium having encoded thereon instructions executed on a computer for a utility computing environment, the computer program product comprising:
first instructions for displaying at least one of an infrastructure view and an application view of a current service level for a customer, wherein the infrastructure view contains information technology hardware and software components, wherein the application view contains software applications residing on utility computing resources, and wherein the infrastructure view and the application view are linked;
second instructions for presenting a view of a promised service level based on service level agreement parameters, wherein the infrastructure view and the application view show a relationship between the current service level and the promised service level, and wherein the relationship indicates a progress level of a service request with respect to a service level agreement with the customer;
third instructions for generating a first rebate in response to successfully completing a service request using less time than specified in the service level agreement based on a completion time and a promised completion time, wherein the completion time is an amount of time used to successfully complete the service request, wherein the promised completion time is an agreed upon amount of time to complete the service request specified in the service level agreement, and wherein the completion time is less than the promised completion time;
fourth instructions for generating a second rebate in response to breeching the service level agreement;
fifth instructions for providing the first rebate and the second to a customer when a plurality of discrepancies between the current service level and the promised service level occur, wherein the first rebate and the second rebate assure that the customer pays for service rendered, wherein one of the plurality of discrepancies occurs in response to successfully completing the service request using less time than specified in the service level agreement, and wherein another of the plurality of discrepancies occurs in response to breeching to the service level agreement;
sixth instructions for retrieving additional details of the at least one of the infrastructure view and the application view by clicking on a component of the at least one of the infrastructure view and the application view, wherein the additional details include the rebate and an impact for breaching the service level agreement; and
seventh instructions for switching between the infrastructure view and the application view.

25. The computer program product of claim 24 further comprising:
instructions for alerting at least one of a customer, a service provider, and a utility computing host of the plurality of discrepancies between the current service level and the promised service level, wherein the relationship shows a severity level for the plurality of discrepancies.

* * * * *